United States Patent [19]
Breame

[11] Patent Number: 6,003,035
[45] Date of Patent: Dec. 14, 1999

[54] METHOD AND APPARATUS FOR BUILDING A TELECOMMUNICATIONS NETWORK DATABASE

[75] Inventor: Francis V Breame, Hampshire, United Kingdom

[73] Assignee: British Telecommunications public limited company, London, United Kingdom

[21] Appl. No.: 08/894,057

[22] PCT Filed: Feb. 13, 1996

[86] PCT No.: PCT/GB96/00333

§ 371 Date: Aug. 29, 1997

§ 102(e) Date: Aug. 29, 1997

[87] PCT Pub. No.: WO96/25715

PCT Pub. Date: Aug. 22, 1996

[30] Foreign Application Priority Data

Feb. 13, 1995 [EP] European Pat. Off. .............. 95300878

[51] Int. Cl.⁶ .................................................... G06F 17/30
[52] U.S. Cl. ................................ 707/102; 707/4; 707/103
[58] Field of Search ..................................... 707/102, 103

[56] References Cited

U.S. PATENT DOCUMENTS

| | | | |
|---|---|---|---|
| 4,908,759 | 3/1990 | Alexander et al. ....................... | 707/101 |
| 5,119,465 | 6/1992 | Jack et al. ................................ | 395/500 |
| 5,446,885 | 8/1995 | Moore et al. ............................ | 707/103 |
| 5,611,076 | 3/1997 | Durflinger et al. ...................... | 395/613 |
| 5,619,713 | 4/1997 | Baum et al. ............................. | 395/800 |

OTHER PUBLICATIONS

Database and Expert Systems Applications. 5ᵀᴴ International Conference, Dexa '94 Proceedings, Proceedings of Dexa 94, Athens, Greece, Sep. 7–9, 1994, ISBN 3–540–58435–8, 1994, Berlin, Germany, Springer–Verlag, Germany, pp. 125–134, XP002003087 Castellanos M et al; "Semantically enriching relational databases into an object oriented semantic model" see p. 125, line 1–p. 127, line 4 see p. 132, line 36–p. 133, line 5.

BT Technology Journal, Jul. 1991, UK, vol. 9, No. 3, ISSN 0265–0193, pp. 18–26, XP002003088 Williamson G I Et al: The application of information modelling in the telecommunications management network: see page 18, Col. 2, line 1–page 19, Col. 2, line 1.

IBM Journal of Research and Development, Sep. 1976, USA, vol. 20, No. 5, ISSN 0018–8646, pp. 483–497, XP002003089 Lum V Y et al: "A general methodology for data conversion and restructuring" see the whole document.

*Primary Examiner*—Paul R. Lintz
*Assistant Examiner*—Jean Bolte Fleurantin
*Attorney, Agent, or Firm*—Nixon & Vanderhype P.C.

[57] ABSTRACT

Method and apparatus builds a telecommunications network database from an existing network database. The existing network database is processed to extract data which is then stored in an intermediate database. The intermediate database has a structure which is different to the structure of the existing network database. The intermediate network database is then processed to produce a final database which can be used in a network management system. Less processing effort is required to produce an intermediate database and then to derive from it the final database, than would be the case if the final database were to be derived directly from the existing database.

7 Claims, 11 Drawing Sheets

METHOD AND APPARATUS FOR BUILDING A TELECOMMUNICATIONS NETWORK DATABASE

BACKGROUND OF THE INVENTION

1. Field of the Invention

This invention relates to a method and apparatus for building a telecommunications network database.

2. Related Art

Telecommunications networks are managed by network management systems which decide the way in which the network is configured and monitor the performance of components of the network. The management function is performed by reference to information concerning the network stored in an associated network database. The information that is stored may include an identity of a particular item of equipment such as its serial number, model and manufacturer information, and details of a person or organisation responsible for repairing faults on that equipment. Thus, if a fault occurs with that piece of equipment, a network manager will be able to rapidly send a request for its repair. Other information that is stored, is information about the equipment's performance which will be used when network configuration decisions are made.

When it is thought desirable to replace the existing network management system, a problem occurs because a system has to be chosen which is compatible with the existing database. The reason for this is that the database may include information on a very large number of items of equipment. Typically, information on thousands of circuits will be held. It has been perceived that to do otherwise would require building a new database from scratch which is compatible with the new network management system. The time to do this has been prohibitive, two typical telecommunication circuits requiring about two hours to enter into a database.

The present invention arose out of a realisation by the inventors that it was not necessary to build a new compatible database from scratch, but that it would be possible to utilise the existing database.

In U.S. Pat. No. 4,908,759, a process is described for transitioning a hierarchial input database to create a hierarchical output database. The process occurs in two stages. In the first stage, intermediate data is produced. In the second stage, the intermediate data is mapped to the form required by the output database.

SUMMARY OF THE INVENTION

According to a first aspect of the present invention, there is provided a method of building a final telecommunications network database in a memory of a computer system by storing data arranged according to a first structure, said data being extracted from an existing database having data arranged to a second structure different from said first structure, the method comprising the steps of:

creating an intermediate database in which data can be stored in a third structure different from said first and second structures;

inputting a first set of rules into said memory, said first set of rules specifying a set of object classes which are to be used in the intermediate database and how to create and populate objects for each class in the intermediate database from the data stored in the existing database;

creating in said memory a model, by using said classes, of the object hierarchy to be used in the intermediate database;

inputting a second set of rules which specify how objects are created and populated in said final database from objects in said intermediate database;

using said first set of rules to create and populate objects in the intermediate database from data stored in the existing database; and using said second set of rules to create and populate objects in the final database from objects stored in the intermediate database.

By creating and populating an intermediate database with data which is not arranged according to the first structure, less processing effort is required to build the telecommunications network database by selection of data from the intermediate database, than if an attempt were to be made to directly restructure the existing database or by assembling data from another source.

A further advantage of the invention is that most of the complexity in building the final network database is involved in creating and populating the intermediate database from the existing database. Once the intermediate database is created and populated, it is then relatively easy to then populate the final network database. If the required form of the final network database changes it is then relatively easy to change the rules for populating the final database to cater for the change. This may be achieved without having to change the way in which the intermediate database is created and populated. Since the creation and population of the intermediate database is the most complex part of the method, a considerable amount of work is saved.

The existing database may be a database of an existing network management system or a database distinct from a network management system, for example, a computer-held database which is accessed by personnel who configure the network manually.

By structure, it is meant a logical rather than physical structure in which the data is organised in the database. In the described preferred embodiment the first structure is arranged to support an object oriented program used to manage the network. Information on the objects is stored in the database in a structure that allows the objects to be instantiated. By instantiated, it is meant that the objects can be reconstructed from the stored information.

BRIEF DESCRIPTION OF THE DRAWINGS

A specific embodiment of the invention will now be described, by way of example only, with reference to the drawings in which.

DETAILED DESCRIPTION OF EXEMPLARY EMBODIMENTS

Figure 1:
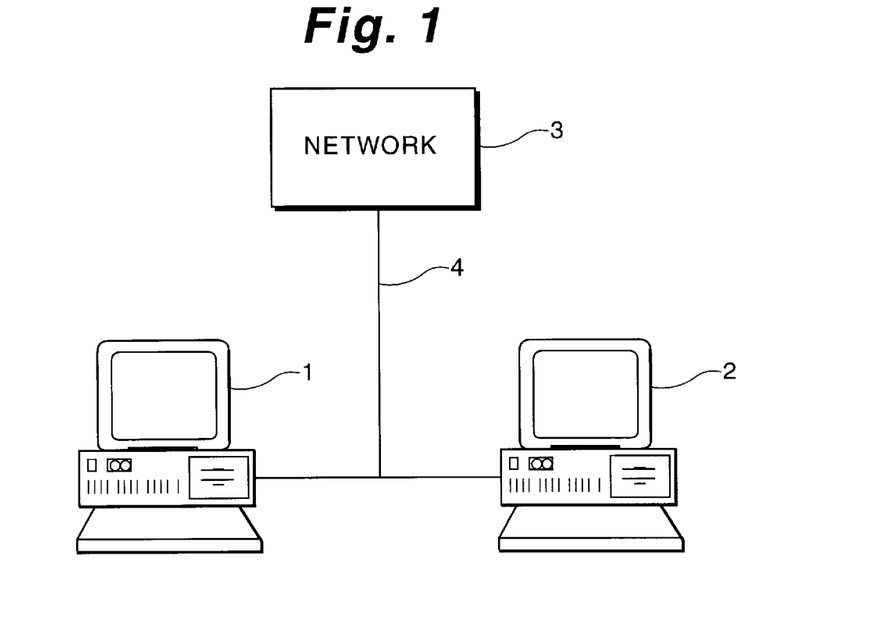
FIG. 1 shows in schematic form apparatus in accordance with an embodiment of the invention.

With reference to FIG. 1, apparatus operating in accordance with the invention comprises two computer workstations 1, 2 conforming to Sun Sparc architecture, for example, workstations available from Sun Microsystems Corporation and a telecommunications network 3. The workstations 1, 2 are Unix based and networked together with file servers to form one homogenous network. It will be readily appreciated that in a Unix based system that memory is distributed over the system. However for the purposes of this description memory will be described with reference to particular terminals. In reality the databases stored on the system may be stored over a number of terminals.

The telecommunications network 3 is of a known type comprising private branch exchanges (PBXs), local area networks, wide area networks, transmission paths, bridges and routers.

Figure 2:
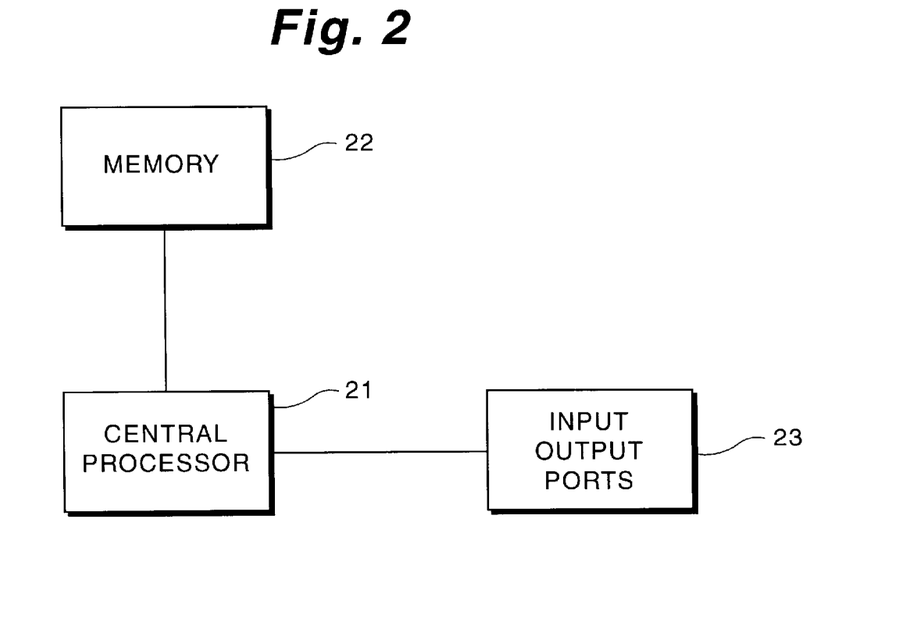
FIG. 2 shows in schematic block diagram form part of the apparatus shown in FIG. 1.

As is shown in FIG. 2 workstation 1 includes a central processor 21, memory 22 and input output ports 23 linked by databuses in the normal way.

Figure 3:
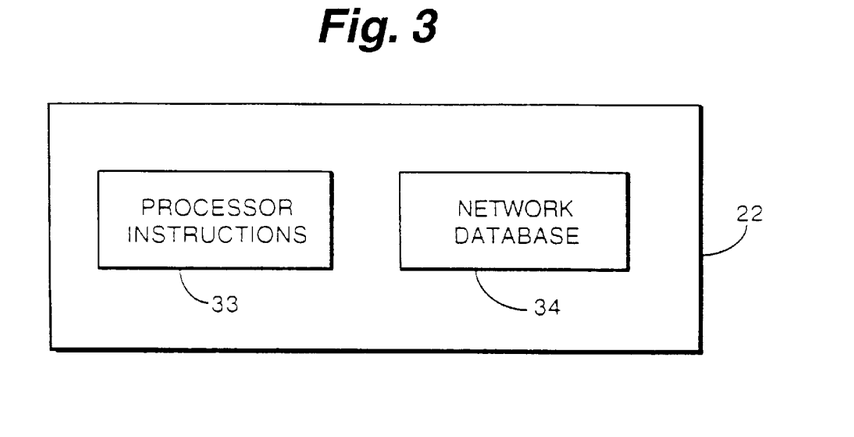
FIGS. 3 and 4 show in schematic block diagram form databases used in the apparatus.

The memory 22 is in the form of a hard disc drive (not shown) and it stores processor instructions 33 and a network database 34 as shown in FIG. 3. The processor instructions 33 comprises a plurality of machine code entries held at memory locations on the disc. The central processor 21 operates in accordance with the processor instructions 33 and the network database 34 stores information about elements that form the network 3.

The workstation 1 operates as a network manager, monitoring and controlling the network 3. Information about the network 3 is received by the network manager along communication path 4 and via input output ports 23. Instructions are sent by the network manager to the network 3 via the same route.

The network manager receives information about the network 3 and also passes instructions to the network 3 along communication path 4. The instructions will include for example network configuration instructions.

Figure 4:
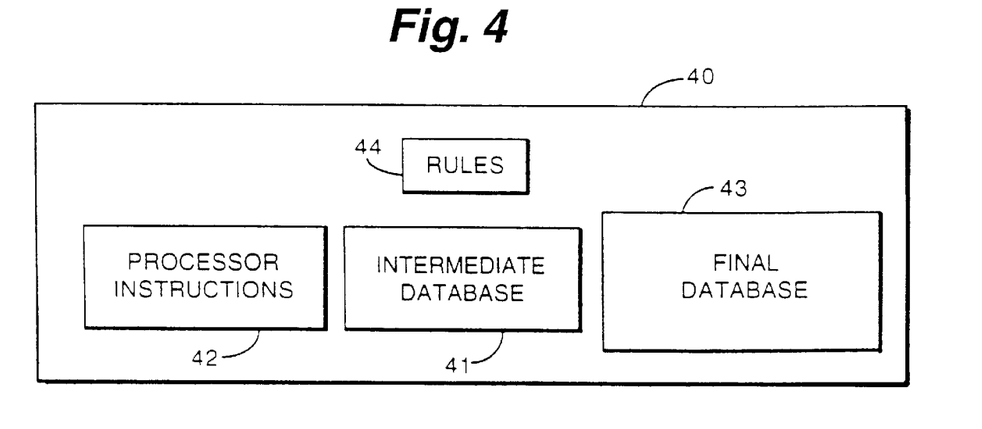

Workstation 2 is nominally identical to workstation 1 but it is programmed with a different network managing program to the first. Whilst the hardware components of workstation 2 are identical to those shown in FIG. 2, it has a memory 40 configured, as shown in FIG. 4, to hold an intermediate database 41, a processor instructions memory 42 and memory 43 allocated for a final database. The memory 40 is also configured to hold a rules database 44. The rules database 44 is initially empty but is used to store rules input by a user at a later stage.

A network authority wishes to transfer management of the network from workstation 1 to workstation 2. For workstation 2 to manage the network 3 it will require access to a database of information about the network. However, the database must be compatible with the network managing program it operates. In this specific embodiment, the network management program operated by workstation 2 is called "ServiceView" available from British Telecommunications plc of 81 Newgate Street, LONDON. The program is stored in the processor instructions memory 42. "ServiceView" is an object orientated program and thus requires a database having a structure which supports an object orientated program. In such a program real life objects, that is to say, components of the network 3, are modelled by software objects having attributes. The database will contain data on the attributes of the corresponding real life object. The data is structured in a compatible database in such a way that the objects can be instantiated from the data.

The existing network database 34 held in the memory of workstation 1 is not compatible with the "ServiceView" program and cannot be directly utilised by workstation 2. However, the data held in the existing database 34 can be utilised to build a new compatible database in the following way.

The processor instructions memory 42 stores a database build tool in addition to the above mentioned "ServiceView" program. The database build tool is a program for building the new compatible database from the existing network database 34. A general overview of the operation of the database build tool will first be given with reference to FIG. 5.

Figure 5:
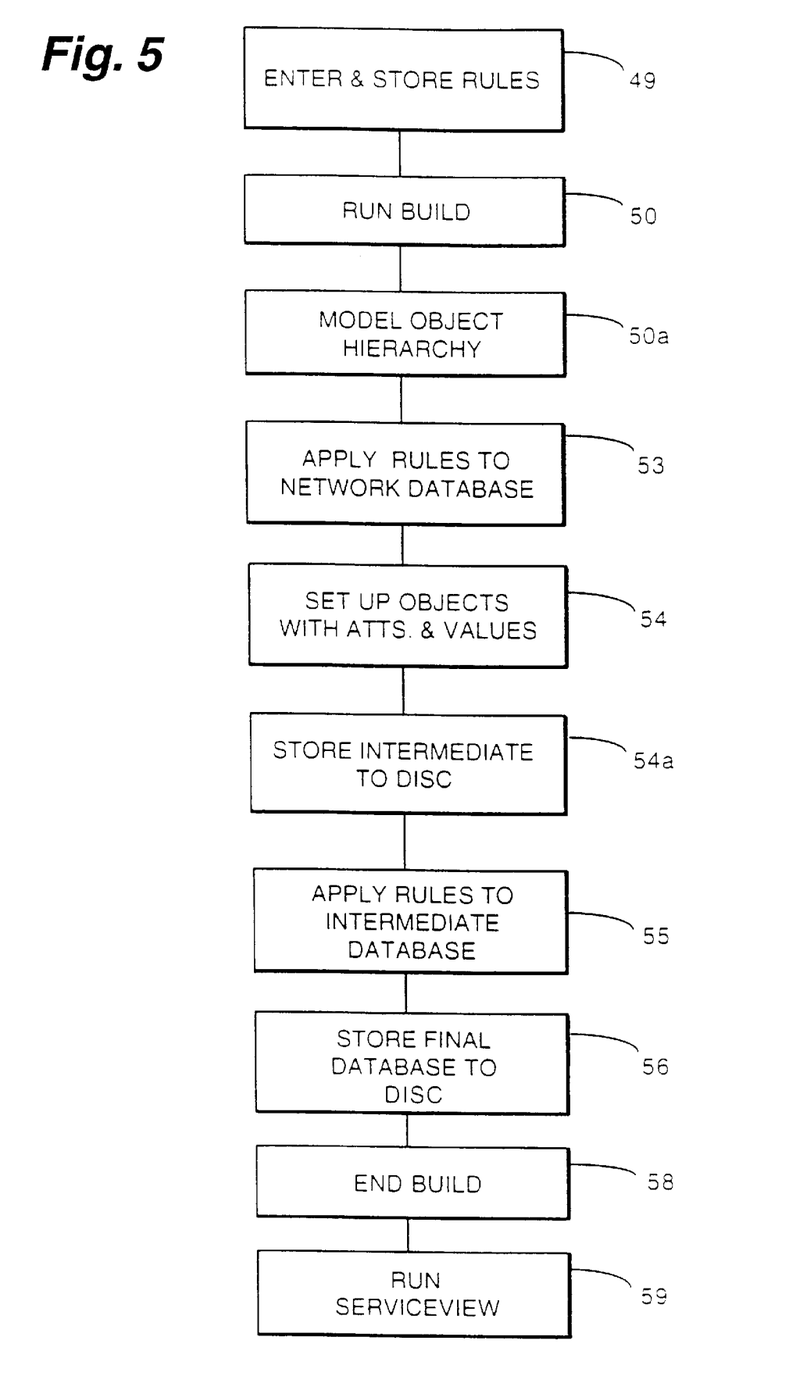
FIG. 5 is an explanatory flowchart.

A preliminary step, step 49, is for the network authority to enter two sets of rules. The first set of rules is to be applied to the existing network database 34 whilst the second set of rules is to be applied to the intermediate database 42 once it has been generated.

The first set of rules input by the network authority relate to the classes of a model to be entered later. The rules can be thought of as entered into classes of the model, since they will specify how objects are created from each class.

The first and second sets of rules are input by the central processor of the workstation 2 into the rules database 44 of the memory 40, step 49. The second set of rules will be changed relatively infrequently because the relationship between the intermediate database 41 and final database 43 is fairly constant and these rules may be used in subsequent database conversion operations. An option to redefine the rules may be offered to the user after the first set of rules has been entered into the classes of the model created in a subsequent step.

The next step is to run the data base build tool by the network authority entering an appropriate command at the workstation 2. This step is represented by step 50 in FIG. 5.

The user then models the object hierarchy to be used in the intermediate database, step 50a. In this step the user models a skeleton object hierarchy on the screen of workstation 2 using a modelling program. The program allows the user to draw on screen a series of hierarchically interlinked nodes. The nodes represent classes in the model which are later used to generate objects.

The processor 21 of the second workstation 2 then applies the first set of rules to the existing network database 34, box 53. This results in relevant items of data being copied and used to populate the intermediate database 41, with objects, their attributes and values, step 54. The intermediate database is then stored on disc as represented by step 54a.

The processor 21 of the second workstation 2 then applies the second set of rules to the intermediate database 41, as represented by step 53. This structures the extracted data into the compatible final database in the memory 43. The final database is then downloaded onto disc, as represented by step 56.

The database build tool program then ends, step 58 and the network authority runs "ServiceView" step 59 to manage the network 3.

Workstation 1 can then be disconnected from the network 3 or utilised for some other function.

Figure 6:
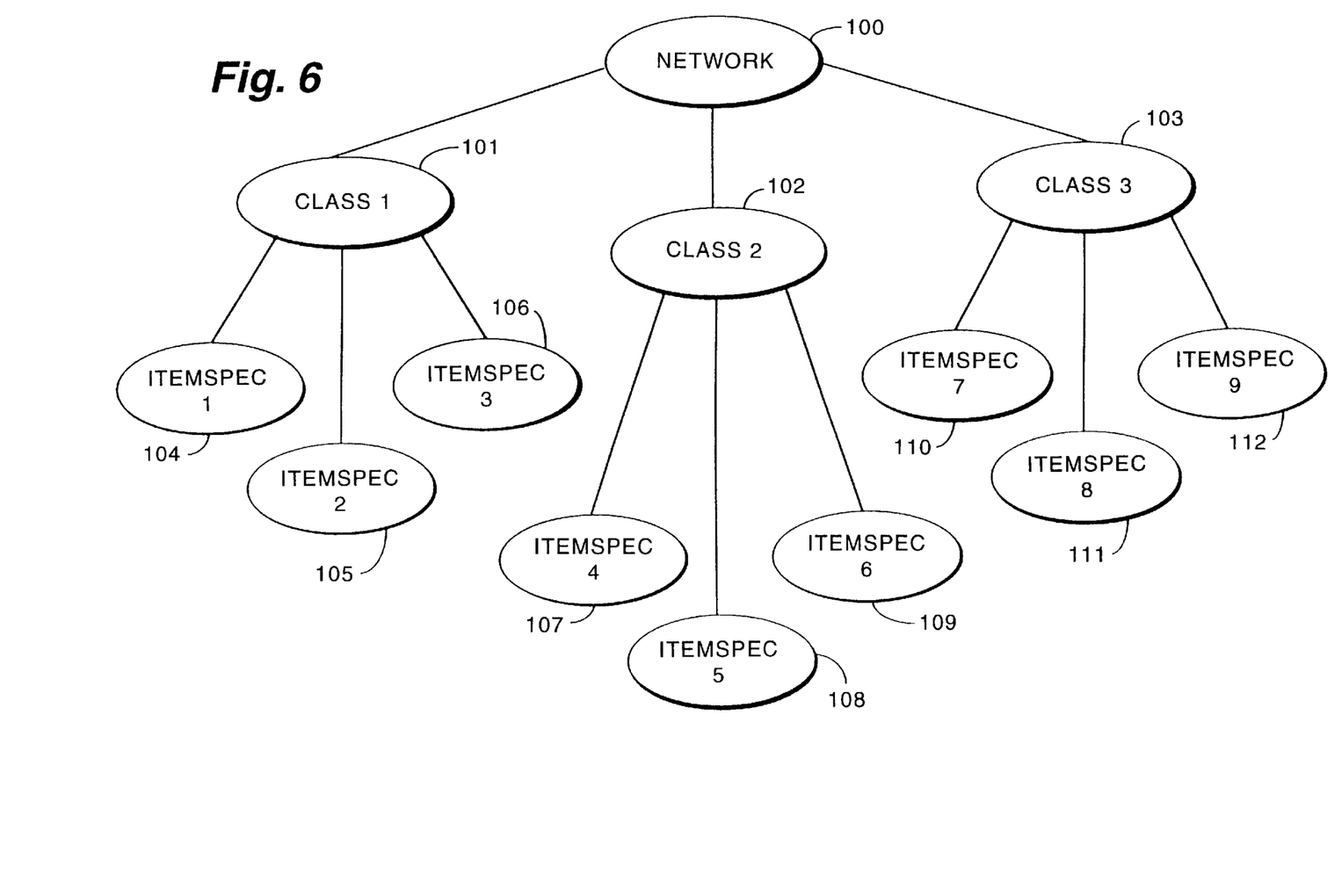
FIGS. 6 and 7 show models used in the preparation of an intermediate database in the invention.

Modelling the object hierarchy step 50a will now be described in greater detail. The network authority will initialise the modelling program. This allows the network authority to draw on the screen of workstation 2 a model of the network using the workstation's associated keyboard and mouse. FIG. 6 shows, in schematic form, the display.

The modelling program has options to permit a node of the model to be created and further nodes to be created depending from that node. Thus, a first or root node 100 named NETWORK is created from which nodes 101, 102 and 103 depend. Each node represents a class of objects: node 101 represents objects falling within class 1; node 102 represents objects falling within class 2; and node 103 represents objects falling within class 3. Each class may be drawn as being a super-node having one or more sub-nodes. As shown in FIG. 6; class 1 is drawn as having three sub-nodes 104, 105, 106; class 2 is drawn as having these sub-nodes 107, 108, 109; class 3 is drawn as having three sub-nodes 110, 111, 112.

As the network is modelled, the network authority enters rules from the first set of rules into each of the classes. The rules being extracted from the rules database 44. Thus, when node 101 has been drawn, the network authority enters a rule which will be used to select data for inclusion into objects of that class, that is to say, class 1. Similarly, the sub-nodes are also provided with rules to select appropriate data. The rules are called ITEMSPEC1 to ITEMSPEC9. The rules may also have sub-rules.

Figure 7:
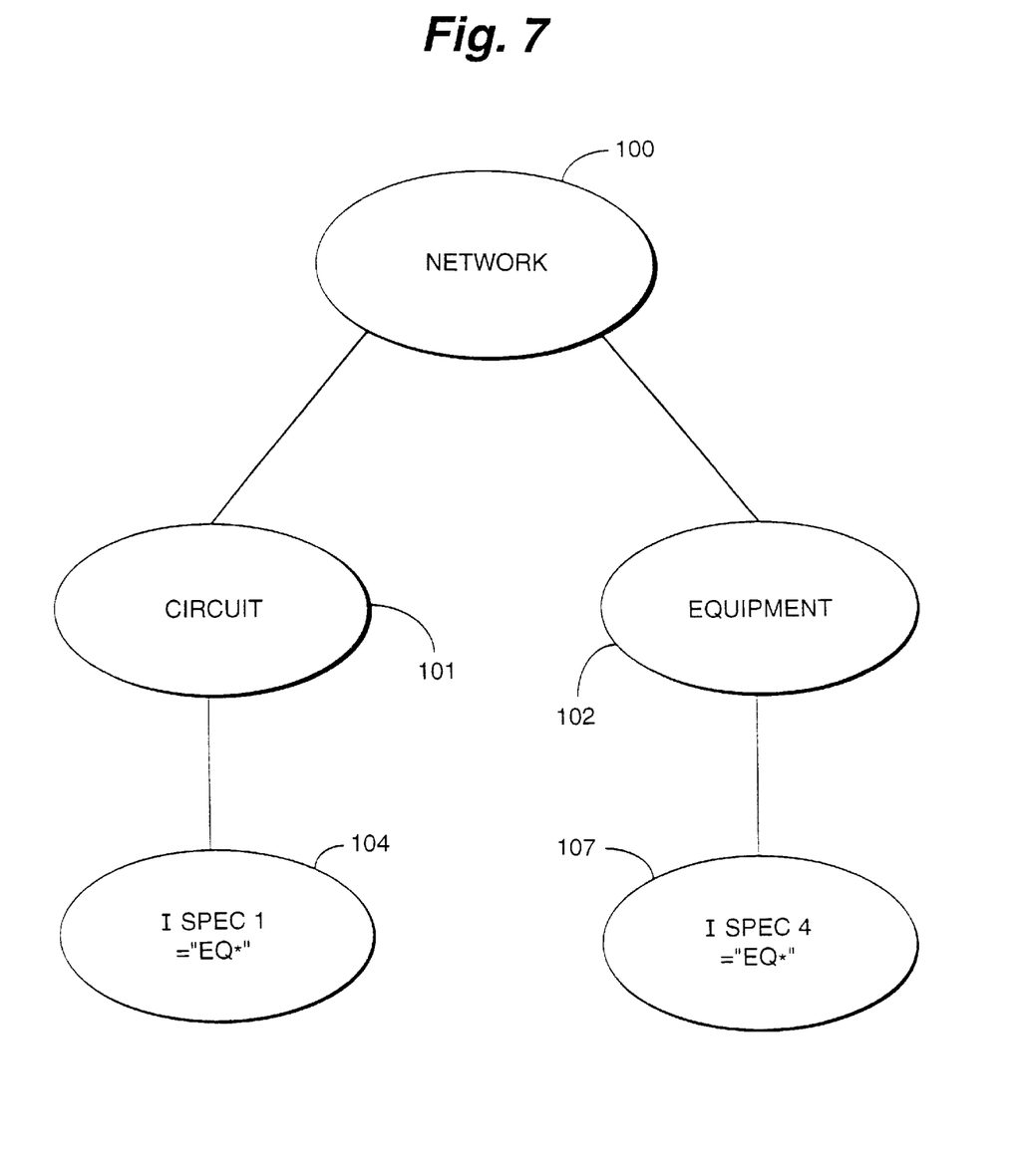

In this specific embodiment, the modelled hierarchy is as shown in FIG. 7. It can be seen that the root node 100 is called NETWORK which has two sub-nodes, a first node 101 being called CIRCUIT and a second node 102 being called EQUIPMENT. Thus, there are three classes of objects that can be classified as NETWORK, CIRCUIT and EQUIPMENT. The sub-nodes 104, 107 of CIRCUIT 101 and EQUIPMENT 102 have entered into them item specification rules ITEMSPEC1="EQ*" and ITEMSPEC4="EQ*". These rules will match any string starting with "EQ", the "*" character meaning any text can follow "EQ".

It should be emphasised here that the model shows nodes and sub-nodes which equate to classes and sub-classes of objects that comprise the network 3. Although only five nodes are shown in FIG. 7, there will be very many more than five objects that fall within the classes, that is to say, the data held in the existing database 34 when subjected to the rules written in the classes will usually generate more than one object per class.

The form of the first set of rules entered and stored in step 49 will become apparent in the following description of the subsequent step 53 of applying the rules to the network database and step 54, that of setting up objects in the intermediate database 41.

More detailed explanation will now be given of steps 49 and 53 to 56.

Figure 8:
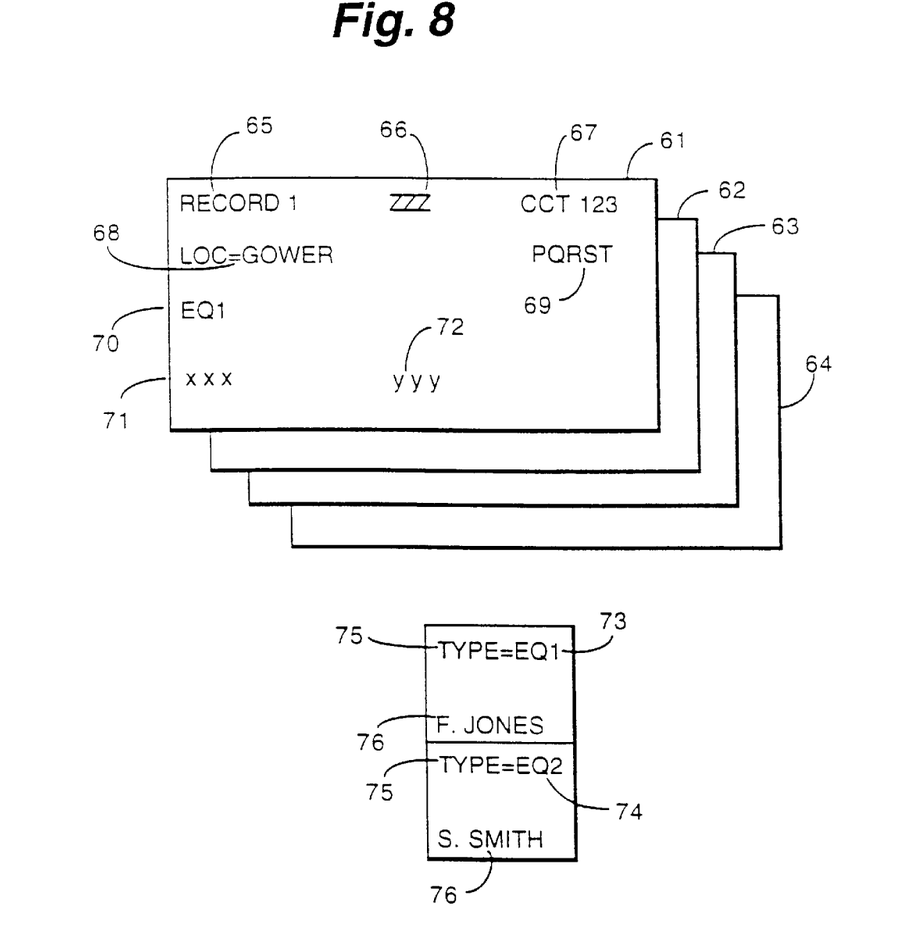
FIGS. 8 and 9 show in schematic form datastructures used in the invention.

The rules to be applied will depend on the nature of the existing network database and the configuration of the new database. The network authority will have an understanding of the way in which the existing network database is configured. In the specific embodiment the existing database 34 is configured to hold data as a series of records as shown in FIG. 8. The records are arranged in the manner of a card file, each record being a card in the file. Only four records 61, 62, 63 and 64 are depicted in FIG. 8 although there are in practice many more than are shown. The database also includes a set of responsible person records 73, 74 which will be described later.

Each record 61, 62, 63 and 64 has the same format with nine data fields 65 to 72.

Datafield 65 contains data which labels the record. In the case of record 61 this label is "RECORD 1". The other records 62, 63 and 64 will be consecutively labelled "RECORD 2", "RECORD 3", "RECORD 4" and so on.

Datafields 66, 69, 71 and 72 contain data which is only relevant to the existing network database 34 and will not be used to build the new object orientated final database 43. The data is represented in the figure as "ZZZ", "PQRST", "XXX" and "YYY".

Datafield 67 contains a label for the particular component of the network 3 to which the record relates. For "RECORD 1" this is "CCT123" which is a circuit on the network 3.

Datafield 68 contains information about the location of the component. In this case the entry is "LOC=GOWER" which signifies that the circuit is located in an establishment at Gower Street.

Datafield 70 contains information about the type of equipment to which the record relates. In this case the equipment is of the type "EQ1".

Figure 9:
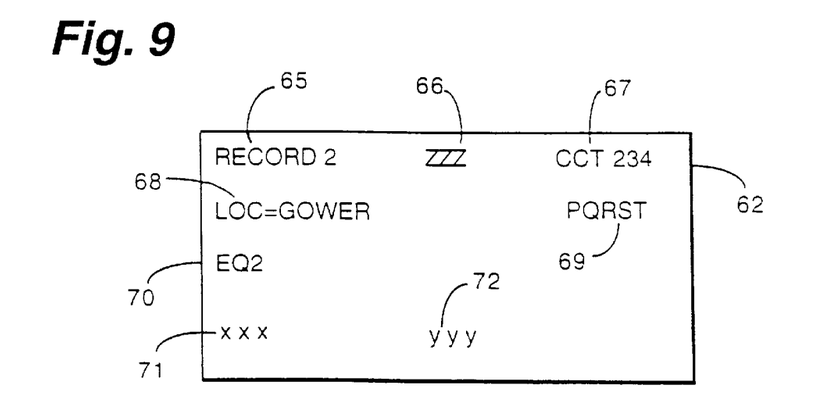

FIG. 9 shows "RECORD 2" and it will be readily observed that it is of the same format as "RECORD 1" and thus the datafields are numbered in the same way as for "RECORD 1". The datafields differ however, for in this case the equipment is of the type "EQ2", the label of the equipment is "CCT234" and the record is labelled "RECORD 2". The location is again Gower Street for the datafield 68 has the entry "LOC=GOWER". The remaining datafields 66, 69, 71 and 72 have the same entries as for "RECORD 1".

The network database 34 also includes a set of responsible person records 73 and 74. These records store information about items of equipment, in particular, the name of an individual or organisation responsible for maintaining the equipment.

Each record 73, 74 has an equipment type datafield 75 containing a descriptor of the type of equipment. In the case of record 73, the descriptor is "EQ1" meaning equipment of type 1. In the case of record 74 it is "EQ2" meaning equipment of type 2.

A responsible person datafield 76 is also provided on each record 73, 74. This contains a name of a person responsible for maintenance of that particular type of equipment. For record 73 the datafield 76 contains the name "F. JONES" and for record 74 the datafield 76 contains the name "S. SMITH". Thus for maintenance of equipment of type EQ1, F. JONES is to be contacted whilst for equipment of type EQ2, S. SMITH should be contacted.

A screen prompt is displayed on a Visual Display Unit VDU of workstation 2 and the network authority then enters a first set of rules which will extract relevant data from the records 61, 62, 63 and 64 and from the responsible persons' records 73 and 74. The rules being entered into the model nodes as earlier described.

In summary, this embodiment has two data files, one containing the circuit records and the other containing the responsible persons. The data files are set out in tabular form below.

| File 1    | Datafield 67 | Datafield 68 | Datafield 70 |
| --------- | ------------ | ------------ | ------------ |
| Record 61 | CCT123       | LOC=GOWER    | EQ1          |
| Record 62 | CCT234       | LOC=GOWER    | EQ2          |
| Record 63 | CCT345       | LOC=IPSWICH  | EQ1          |
| Record 64 | CCT456       | LOC=GLASGOW  | EQ2          |
| File 2    | Datafield 75 | Datafield 76 |              |
| Record 73 | EQ1          | F. JONES     |              |
| Record 74 | EQ2          | S. SMITH     |              |

It is with a knowledge of this structure that the network authority formulates the two sets of rules.

The rules embody a method of treating the existing database to extract the required data and to order it as the intermediate database 41.

Before describing the first set of rules in detail a general overview will be given with reference to the explanatory diagrams shown in FIGS. 10 to 13.

Figure 10:
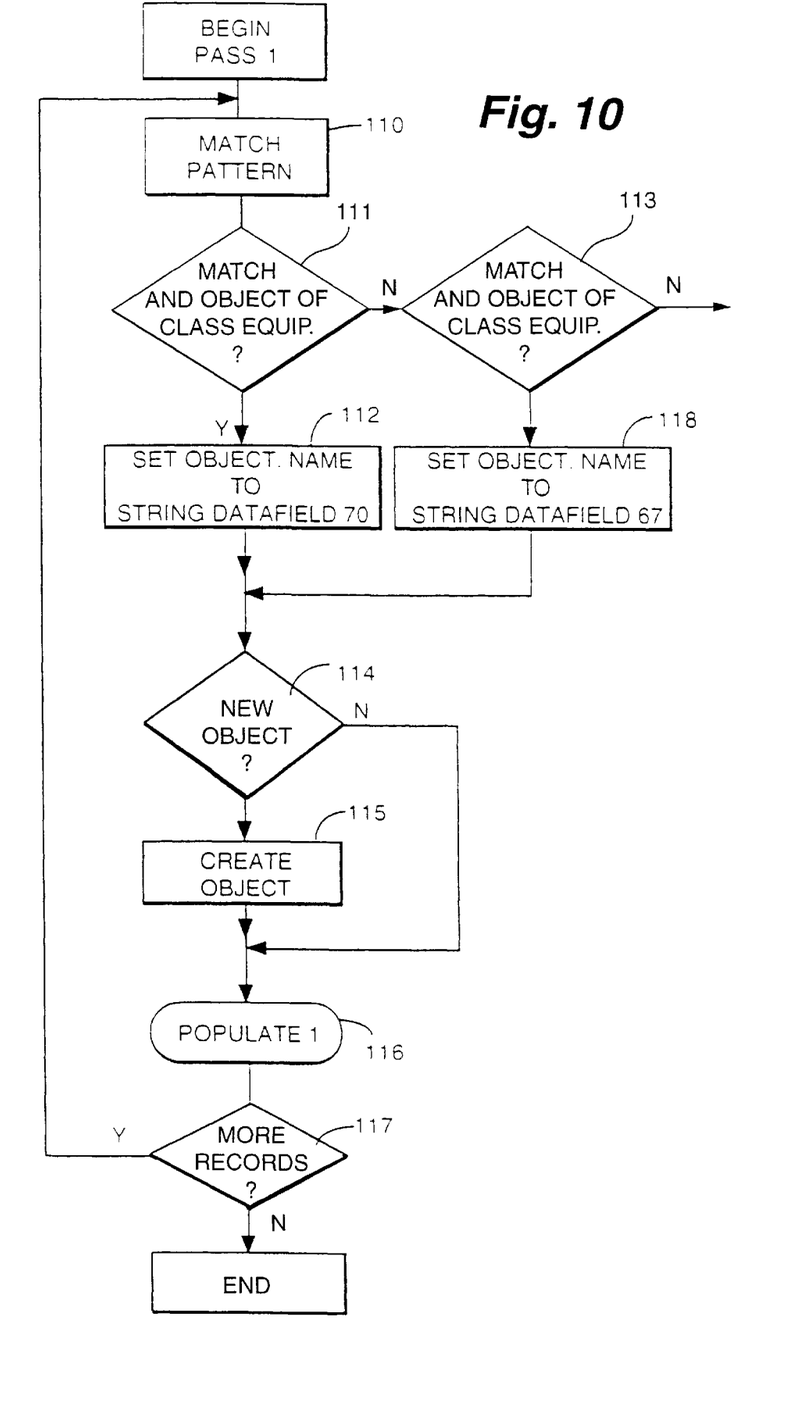
FIGS. 10 to 14 are explanatory flowcharts.

The first process embodied in the rules is a first pass through the data in file 1 in order to create objects. The first step in this pass is a matching step, represented by box 110. The matching step comprises examining a string in a datafield of a record in the database against a pattern in the object templates of the model. In this case datafield 70 is examined.

The next step is to consider whether the match and object template are of class equipment, as represented by box 111. If this is the case then the object name is set to that of the string stored in datafield 70, as represented by box 112.

If the match and object template is not of class equipment then consideration is given to whether they are of class circuit, as represented by box 113.

If the match and object template are of class equipment then the object name is set to the string held in datafield 67, as represented by box 118.

The next step after those represented by boxes 112, 113 is consideration as to whether a new object is involved that is to say the object has not been created after treatment of a previous record. This step is represented by box 114.

If the object is a new object then it is created as represented by box 115.

The next step after creation of an object or a decision that the object is not new is to populate the object with data following a procedure represented by box 116. If there are more records then the above described process is repeated from the matching step represented by box 110.

The population procedure extracts some data from the records and stores it in the objects created in the earlier steps.

Figure 11:
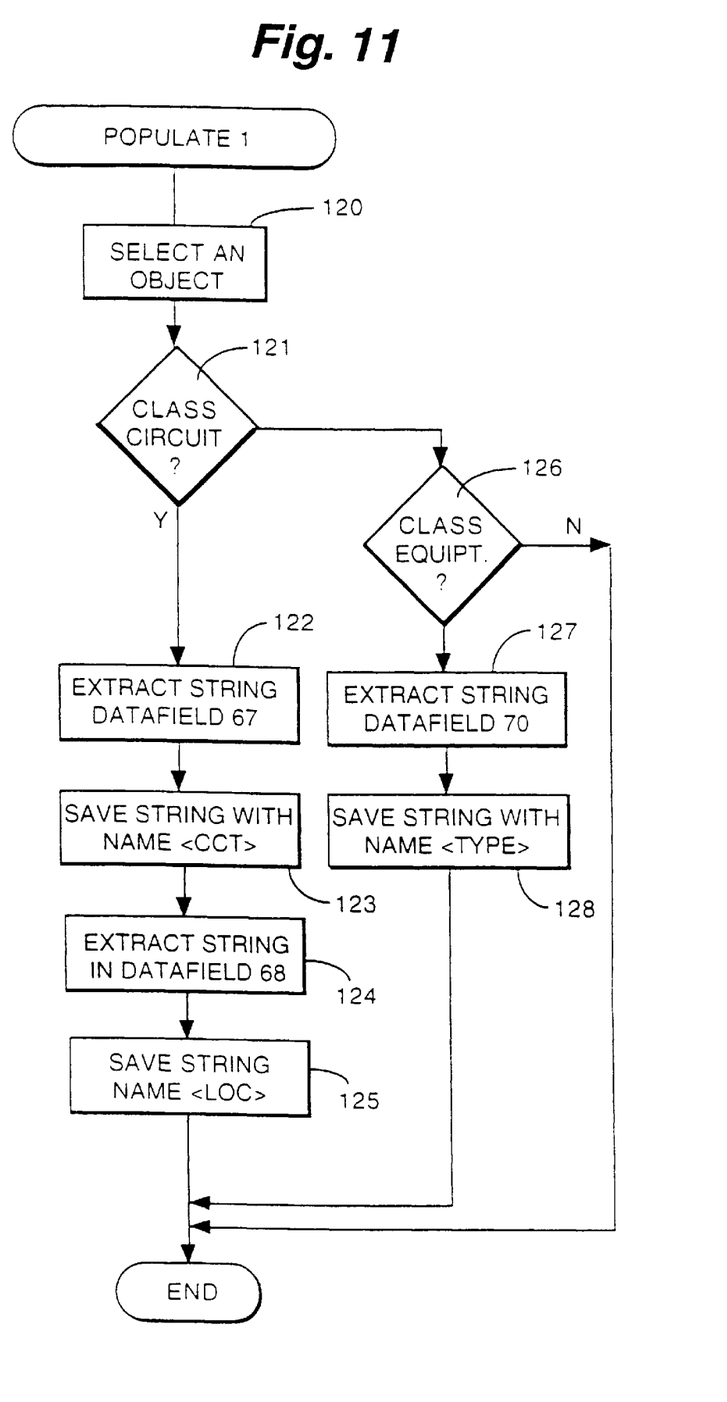

The first step in this procedure is to select a created object, as represented by box 120 in FIG. 11.

The object is then examined to discover whether it is of class circuit, as represented by box 121.

If the object is of class circuit then the string in datafield 67 is extracted, as represented by box 122. The extracted string is then saved as the name of the circuit in the selected object, as represented by box 123.

The next step is for the string in datafield 68 to be extracted, as represented by box 124. The extracted string is then saved as the location in the selected object, as represented by box 125.

If the object is not of class circuit then the next step after the step represented by box 121 is a query as to whether the object is of class equipment. This step is represented by box 126.

If the object is of class equipment then the next step is to extract the string in datafield 70, as represented by box 127. This string is then saved in the name of the location in the selected object, as represented by box 128.

The procedure ends after the steps represented by boxes 125, 128 and 126 (if the object is not of class equipment).

Figure 12:
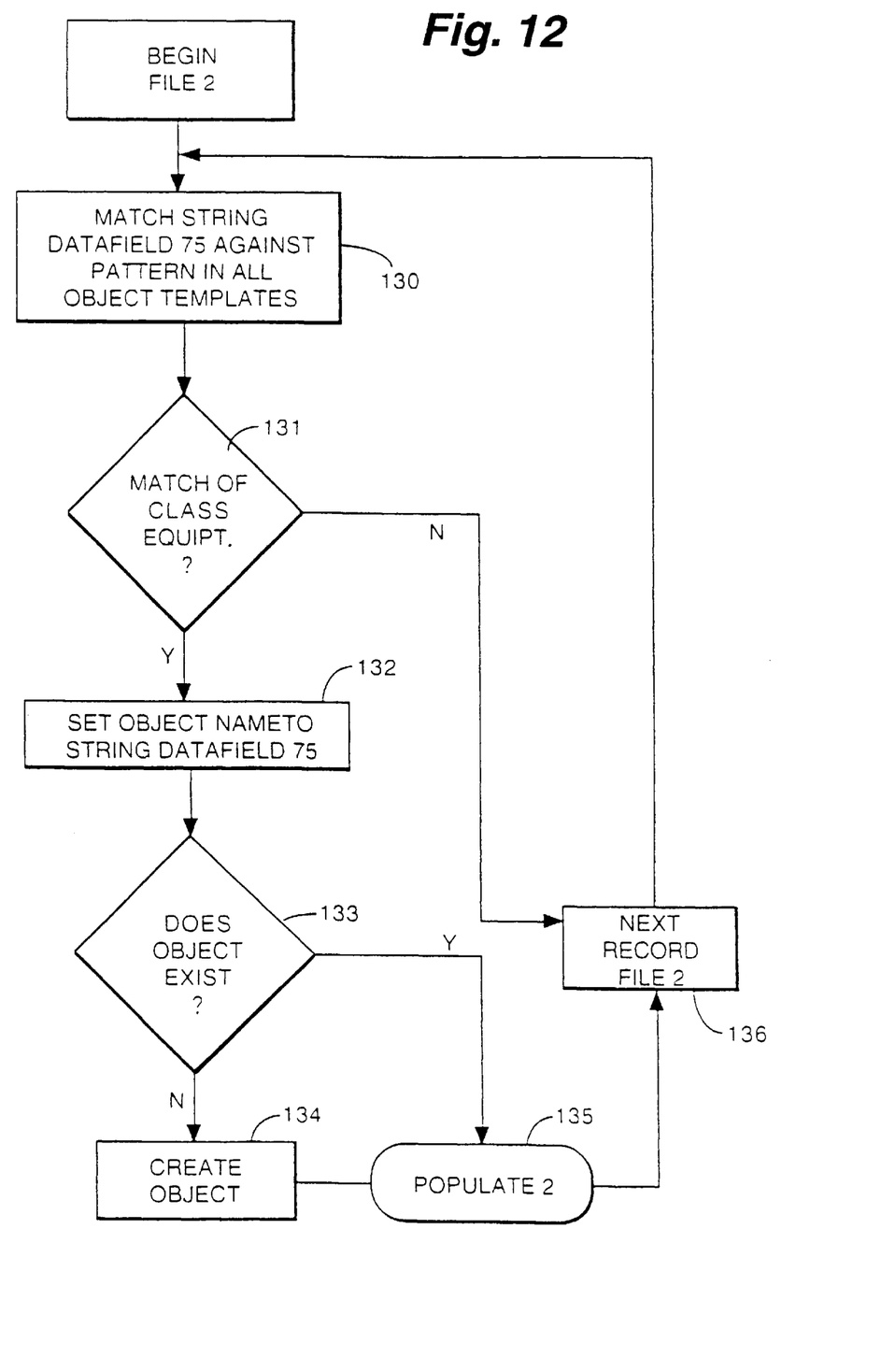

Having thus processed the records in file 1 it is then necessary to process those from file 2 as shown in FIG. 12.

The first step in processing file 2 records is to examine the string in datafield 75 of a first record for a match against the object templates, as represented by box 130. If the match and the template is of class equipment, this query being represented by box 131, then the object name is set to that of the string, as represented by box 132.

The next step is to consider whether the object of this name already exists, as represented by box 133. If the object does not exist then it is created, as represented by box 134.

A second population procedure, as represented by box 136, is then implemented.

The next record in file 2 is then obtained, as represented by box 136. This step is also the next step for step 131 if the match is not of class equipment.

The next record is then processed as before.

Figure 13:
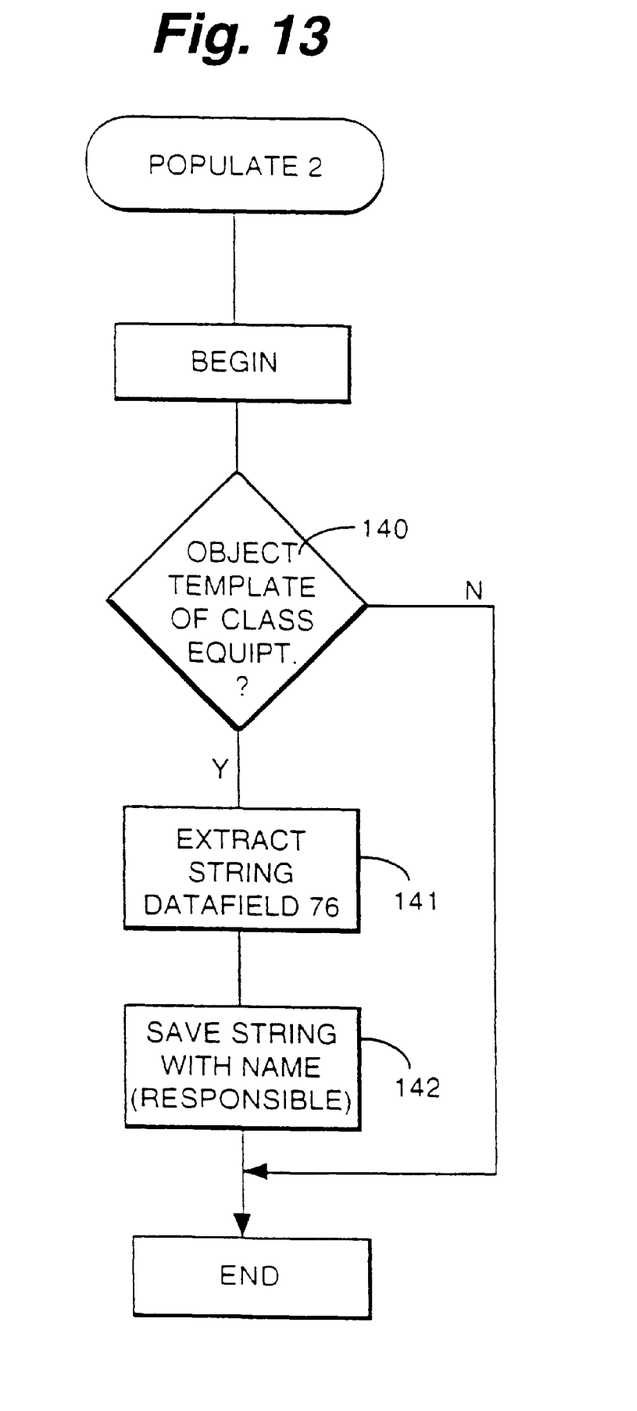

The populate 2 procedure is shown in FIG. 13. The first significant step of the procedure is consideration as to whether the object template is of the class equipment as represented by box 140.

If the object template is of class equipment then the string in datafield 76 is extracted as represented by box 141.

The extracted string is then stored as the name in the responsible datafield of the object, as represented by box 142. The procedure ends and step 136 follows.

The first set of rules, set 1, is as follows:

1. BEGIN {PASS 1 - CREATE OBJECTS AND EXTRACT RAW DATA}
2. FOR EACH RECORD IN DATA FILE 1 {CIRCUIT RECORDS}
3. BEGIN
4. MATCH STRING IN <DATAFIELD 70> AGAINST <PATTERN> IN ALL OBJECT TEMPLATES IN MODEL.
5. IF MATCH AND IF OBJECT TEMPLATE IS OF CLASS <EQUIPMENT> SET OBJECT NAME TO STRING IN <DATAFIELD 70>
6. IF MATCH AND IF OBJECT TEMPLATE IS OF CLASS <CIRCUIT> SET OBJECT NAME TO STRING IN <DATAFIELD 67>
7. IF OBJECT HAVING THIS NAME DOES NOT ALREADY EXIST FOR THIS TEMPLATE, THEN CREATE IT
8. SELECT EXISTING OR NEWLY-CREATED OBJECT
9. IF OBJECT TEMPLATE IS OF CLASS <CIRCUIT> EXTRACT STRING IN <DATAFIELD 67> AND SAVE WITH NAME <CCT> IN SELECTED OBJECT
10. IF OBJECT TEMPLATE IS OF CLASS <CIRCUIT> EXTRACT STRING IN <DATAFIELD 68> AND SAVE WITH NAME <LOC> IN SELECTED OBJECT
11. IF OBJECT TEMPLATE IS OF CLASS <EQUIPMENT> EXTRA STRING IN <DATAFIELD 70> AND SAVE WITH NAME <TYPE> IN SELECTED OBJECT
12. END {RECORDS IN DATA FILE 1}
13. FOR EACH RECORD IN DATA FILE 2 {RESPONSIBLE PERSONS}
14. BEGIN
15. MATCH STRING IN <DATAFIELD 75> AGAINST <PATTERN> IN ALL OBJECT TEMPLATES IN MODEL.
16. IF MATCH AND IF OBJECT TEMPLATE IS OF CLASS <EQUIPMENT> SET OBJECT NAME TO STRING IN <DATAFIELD 75>.
17. IF OBJECT HAVING THIS NAME DOES NOT ALREADY EXIST FOR THIS TEMPLATE THEN CREATE IT.
18. SELECT EXISTING OR NEWLY-CREATED OBJECT
19. IF OBJECT TEMPLATE IS OF CLASS <EQUIPMENT> EXTRACT STRING IN <DATAFIELD 76> AND SAVE WITH NAME <RESPONSIBLE> IN SELECTED OBJECT
20. END {RECORDS IN DATA FILE 2}
21. END {PASS 1}
22. BEGIN {PASS 2 - CREATION OF ATTRIBUTE VALUES}
23. FOR EACH OBJECT CREATED IN PASS 1
24. FOR EACH <ATTRIBUTE RULE> CREATE ATTRIBUTE VALUE USING NAMED DATA SAVED IN STEPS 9. AND 10.
25. END {PASS 2}

In the above rules, < > designates part of the rule which may be set by the network authority before the rules are applied to cater for different forms of database. Each object template (class) in the model has a rule, consisting of a large number of parts (or sub-rules), associated with it.

Line 1 of the rules begins a first pass through the network database 34 to create objects in the intermediate database 41 and to extract data to form values and attributes of those objects.

Line 2 ensures that all the records of file 1 are examined, that is to say, records 61 to 64.

Line 3 begins the processing of each of the records 61 to 64, this procedure comprising lines 3 to 12. The procedure is repeated by virtue of line 2.

Line 4 is concerned with examining the string in datafield 70 of each record against a pattern in all object templates of the model. The pattern is that defined by the rules ITEMSPEC of the classes set up in the model. In this way the rules can be thought of as templates. In this embodiment the ITEMSPEC for both classes CIRCUIT and EQUIPMENT is "EQ*" which will match any string of characters beginning with "EQ".

Lines 5 to 8 are concerned with the creation of new objects or the utilisation of existing objects. The object created is named according to the fields examined in the record. The name is set according to the string in the particular datafield set by the sub-rule. If the object is a new object, that is to say, the object having the name of the datafield set by the sub-rule does not already exist, then the object of that name is created in line 7.

Having created the required objects, the next step is to extract data to be stored in the objects. The data is saved with a "name" which allows the data to be referred to later. "Named" data is called a parameter. Line 9 and 10 perform this operation for objects in the class CIRCUIT.

By line 9 the string found in datafield 67 is extracted and saved with the name "CCT" in the selected object. By line 10 the string found in datafield 68 is saved with the name "LOC" in the selected object. Line 11 performs the operation for objects in the class EQUIPMENT with the string extracted from datafield 70 being saved with the name "TYPE" in the selected object.

By completion of line 11, six objects have been created with the following parameters:

| Object | Class | Parameter | Values |
|---|---|---|---|
| CCT123 | CIRCUIT | CCT | CCT123 |
| | | LOC | GOWER |
| CCT234 | CIRCUIT | CCT | CCT234 |
| | | LOC | GOWER |
| CCT345 | CIRCUIT | CCT | CCT345 |
| | | LOC | IPSWICH |
| CCT456 | CIRCUIT | CCT | CCT456 |
| | | LOC | GLASGOW |
| EQ1 | EQUIPMENT | TYPE | EQ1 |
| EQ2 | EQUIPMENT | TYPE | EQ2 |

Line 12 is an end statement signifying the end of the treatment of records in datafile 1.

Line 13 ensures that the next rules are applied for all the records in datafile 2, that is to say, all the responsible person records.

Line 14 is a begin statement for the rules to be applied to the record in the datafile 2. Line 15 has the first rule to be applied. The string in datafield 75 of each of the records in datafile 2 is matched against the pattern in all object templates of the model.

If there is a match and the object template is of the class EQUIPMENT, then the object name is set to the string in datafield 75, line 16. Should an object so named be a new object, then the object is created, line 17.

Objects are then selected and if the object template is of class EQUIPMENT, the string held in datafield 75 is saved with the name responsible in the selected object, lines 18 and 19.

The treatment of datafile 2 is then complete, line 20 as is pass 1 through the database, line 21.

In this particular example of an existing database, no objects will be created by application of line 17 since they will have been created by application of lines 5 and 7. The objects of class CIRCUIT will not result in any further parameters since line 19 only establishes a parameter where the object is of the class EQUIPMENT. The objects of class EQUIPMENT will result in values of parameter RESPONSIBLE being F.JONES for object EQ1 and S.SMITH for object EQ2. At the end of pass 1 the state of the objects will be:

| Object | Class | Parameter | Values |
|---|---|---|---|
| CCT123 | CIRCUIT | CCT | CCT123 |
| | | LOC | GOWER |
| CCT234 | CIRCUIT | CCT | CCT234 |
| | | LOC | GOWER |
| CCT345 | CIRCUIT | CCT | CCT345 |
| | | LOC | IPSWICH |
| CCT456 | CIRCUIT | CCT | CCT456 |
| | | LOC | GLASGOW |
| EQ1 | EQUIPMENT | TYPE | EQ1 |
| | | RESPONSIBLE | F.JONES |
| EQ2 | EQUIPMENT | TYPE | EQ2 |
| | | RESPONSIBLE | S.SMITH |

Lines 22 to 25 comprise the rules for pass 2, the creation of attribute values for the objects created in pass 1 through the existing database. Line 22 is a begin statement for the second pass. Line 23 is a for statement which ensures that the following rules are applied to each object created in pass 1. Line 24 applies an "attribute rule" to create from the named data (parameter) saved after lines 9 and 10 an attribute value. Each object class or template has its own list of attributes to make up the object. There is an attribute sub-rule to generate each attribute value. The attribute sub-rule is devised and set by the network authority and allows the parameters to be manipulated and combined to form an attribute value.

Applying the attribute sub-rules gives the following objects:

| Object | Attribute | Value |
|---|---|---|
| CCT123 | ID | CCT123/GOWER |
| | SERIAL | 1 |
| CCT234 | ID | CCT234/GOWER |
| | SERIAL | 2 |
| CCT345 | ID | CCT345IPSWICH |
| | SERIAL | 3 |
| CCT456 | ID | CCT456/GLASGOW |
| | SERIAL | 4 |
| EQ1 | TYPE | EQ1 |
| | PERSON | F.JONES |
| EQ2 | TYPE | EQ2 |
| | PERSON | S.SMITH |

Thus, an intermediate database 41 is populated with object attributes.

The next step is to apply a further set of rules embodied as a piece of software or "back end" to derive from the intermediate database the final database 43.

In this embodiment, the final database 43 is structured as a relational database with the data held in the form of two dimensional tables. The particular system employed is the ORACLE (TM) relational database management system available from Oracle Corporation. In a relational database only one type of data structure exists which is the table. The system allows various processes to be applied to the tables, for example, by sub-setting or combining tables of data. For more information on the types of operations performable on the tables of data the reader is directed to "Introduction to SQL" by L. Ellison published by the Oracle Corporation.

The network management system uses the tables to reconstruct (instantiate) the original objects in a manner well known to those skilled in the art of network management.

Figure 14:
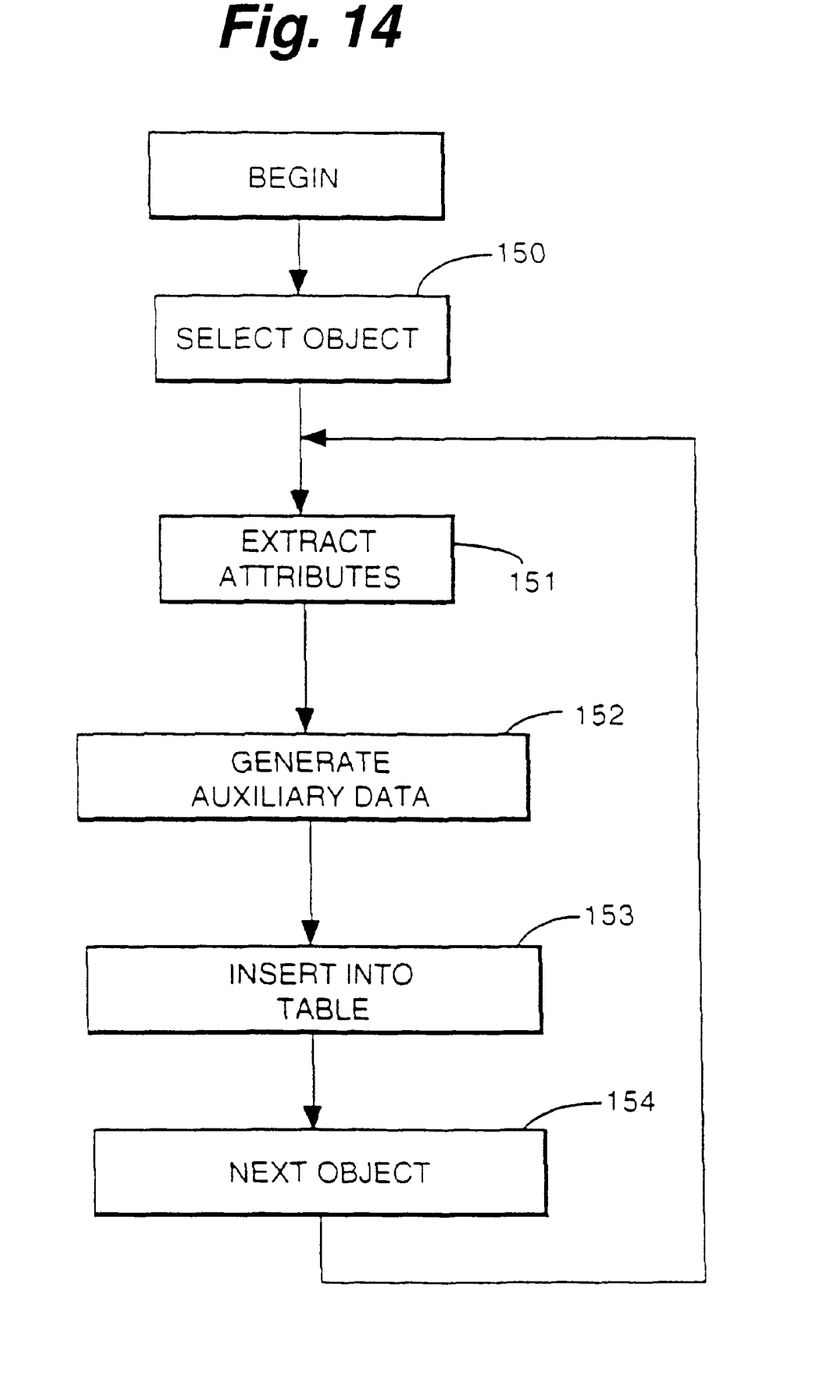

An overview of the way in which tables are produced from the intermediate database 41 will now be described with reference to FIG. 14.

A first step in the process is to select an object from the intermediate database 41, as represented by box 150.

The next step is to extract the attributes of this object, as represented by box 151.

Any required auxiliary data is then generated, as represented by box 152.

Tables are then set up in the final database and the data inserted there, as represented by box 153.

The next object is selected from the intermediate database 41, box 154, and processed as before.

In more detail the tables are produced from the intermediate database 41 in the following way:

```
26. BEGIN {TRANSLATE OBJECTS TO DATABASE TABLE
    REPRESENTATION}
27. FOR EACH OBJECT IN THE INTERMEDIATE DATABASE
28. FOR EACH ATTRIBUTE IN THE OBJECT
29. EXTRACT THE ATTRIBUTE
30. USING RULES DECIDE INTO WHICH TABLE OR TABLES THE
    VALUE IS TO BE INSERTED
31. USING RULES TRANSLATE THE ACTUAL VALUE IF
    NECESSARY
32. USING RULES GENERATE ANY AUXILIARY DATA
    REQUIRED TO BE ENTERED INTO THE TABLES TO
    RECONSTRUCT THE OBJECT'S ATTRIBUTES
33. GENERATE SQL COMMANDS TO INSERT THE VALUE AND
    AUXILIARY DATA INTO THE APPROPRIATE TABLE(S)
34. END {ATTRIBUTES OF AN OBJECT}
35. USING RULES GENERATE ANY AUXILIARY DATA
    REQUIRED TO BE ENTERED INTO THE TABLES TO
    RECONSTRUCT THE OBJECT.
36. GENERATE SQL COMMANDS TO INSERT THE AUXILIARY
    DATA INTO THE APPROPRIATE TABLE(S)
37. END {OBJECT IN INTERMEDIATE DATABASE}
38. END
```

The rules referred to in lines 30, 31 and 35 are rules held as a text-file in rules memory 44. These rules are applied to objects in the intermediate database 41 to generate a set of SQL commands (Structured Query Language). The SQL commands are used by the ORACLE (TM) System to generate the appropriate values in the tables of the final database 43. These commands will be dependent on the desired form of the structure of the data in the final database 43.

What is claimed is:

1. A method of building a final telecommunications network database in a memory of a computer system by storing data arranged according to a first structure, said first structure being an object oriented database structure in which network components are represented as software objects, said data being extracted from an existing database having data arranged according to a second structure different from said first structure, the method comprising the steps of:

creating an intermediate database in which data can be stored in a third structure different from said first and second structures;

inputting a first set of rules into said memory, said first set of rules specifying a set of object classes which are to be used in the intermediate database and how to create and populate objects for each class in the intermediate database from the data stored in the existing database;

creating in said memory a model, by using said classes, of the object hierarchy to be used in the intermediate database;

inputting a second set of rules which specify how objects are created and populated in said final database from objects in said intermediate database;

using said first set of rules to create and populate objects in the intermediate database from data stored in the existing database; and using said second set of rules to create and populate objects in the final database from objects stored in the intermediate database.

2. A method as in claim 1, said step of using said first set of rules to create and populate objects in the intermediate database including the steps of:

searching the existing database for an occurrence of a particular item of data; and after finding said occurrence, creating a corresponding object in the intermediate database.

3. A method as in claim 2, in which said object is named according to a name associated with said item of data.

4. A method as in claim 1 in which the final database is a relational database.

5. A method as in claim 4, in which structured query language commands are used to insert data into appropriate data structures in the relational database.

6. A telecommunications network database produced by a method as in claim 1.

7. A network manager for a telecommunications network including a database as in claim 6.

* * * * *